United States Patent [19]
Neville et al.

[11] Patent Number: 5,662,027
[45] Date of Patent: Sep. 2, 1997

[54] EGG HOLDING KITCHEN UTENSIL

[76] Inventors: Rebecca S. Neville, 319 Pearl St.; Scott D. Lommori, 508 E. Bridge St., both of Yerington, Nev. 89447

[21] Appl. No.: 735,188

[22] Filed: Oct. 25, 1996

[51] Int. Cl.⁶ .................... A47J 27/00; A47J 27/04; A47J 37/00
[52] U.S. Cl. ................. 99/415; 99/403; 99/417; 99/418; 99/440
[58] Field of Search .................. 99/339, 340, 403–418, 99/448, 449, 450, 485, 498, 646 R, 500; 126/369, 390; 219/401; 119/322, 340; 206/521.1, 521.2, 521.8, 508, 553, 815; 426/92, 231, 302, 515, 523, 614; D7/409, 357

[56] References Cited

U.S. PATENT DOCUMENTS

| | | | |
|---|---|---|---|
| D. 346,931 | 5/1994 | Collins | D7/409 |
| D. 354,898 | 1/1995 | Nagy | D7/398 |
| 3,581,653 | 6/1971 | Boyer et al. | 99/440 X |
| 3,589,419 | 6/1971 | Classen | 99/498 |
| 3,876,812 | 4/1975 | Peters | 99/426 X |
| 3,911,806 | 10/1975 | Thomison | 99/415 X |
| 4,276,820 | 7/1981 | Joannou | 99/440 X |
| 4,318,478 | 3/1982 | De Winter | 206/553 |
| 4,656,928 | 4/1987 | Mack | 99/416 |
| 4,842,143 | 6/1989 | McKee, Sr. | 206/521.1 |
| 5,199,347 | 4/1993 | Chen | 99/418 |
| 5,460,083 | 10/1995 | Hutchinson et al. | 99/500 X |
| 5,538,136 | 7/1996 | Onneweer | 206/521.8 |

*Primary Examiner*—Timothy F. Simone

[57] ABSTRACT

An egg holding kitchen utensil including a pair of cylindrical trays. Each tray has a base plate with a plurality of holes and an outer wall with a plurality of holes. A spindle is integral the base plate of each tray. Each spindle has an upper portion with exterior threads and a lower portion with interior threads. The spindle of each tray has at least three long radial walls projecting towards and attaching to the outer wall for defining interior sections within each tray. Included is a handle. The handle has a vertical member with an upper end that has a horizontal member attached. The vertical member has a bottom end with internal threads that are capable of engaging the external threads of the upper portion of the spindle of any one of the pair of trays. Lastly, a lid, with a large center hole, is sized for receiving the bottom end of the handle when the lid is positioned on one of the pair of trays.

7 Claims, 3 Drawing Sheets

EGG HOLDING KITCHEN UTENSIL

BACKGROUND OF THE INVENTION

1. Field of the Invention

The present invention relates to an egg holding kitchen utensil and more particularly pertains to providing a utensil for boiling and storing a large quantity of eggs within and further providing a stackable egg holding utensil.

2. Description of the Prior Art

The use of an egg holder is known in the prior art. More specifically, Egg holders heretofore devised and utilized for the purpose of boiling an egg are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,276,820 to Joannou discloses an automatic egg cooker. U.S. Pat. No. 3,911,806 to Thomison discloses an egg holder. U.S. Pat. No. Des. 346,931 to Collins discloses an egg boiling rack for a pan. U.S. Pat. No. 5,199,347 to Chen discloses a perforated steam plate. Lastly, U.S. Pat. No. 4,656,928 to Mack discloses an apparatus for molding and boiling multiple egg products.

While these devices fulfill their respective, particular objectives and requirements, the aforementioned patents do not describe egg holding kitchen utensil that allows large quantities of eggs to be boiled, drained and stored in the same kitchen utensil.

In this respect, the egg holding kitchen utensil according to the present invention substantially departs from the conventional concepts and designs of the prior art, and in doing so provides an apparatus primarily developed for the purpose of providing a utensil for boiling and storing a large quantity of eggs within and further providing a stackable egg holding utensil.

Therefore, it can be appreciated that there exists a continuing need for a new and improved egg holding kitchen utensil which can be used for boiling and storing a large quantity of eggs within and further providing a stackable egg holding utensil. In this regard, the present invention substantially fulfills this need.

SUMMARY OF THE INVENTION

In view of the foregoing disadvantages inherent in the known types of egg holders now present in the prior art, the present invention provides an improved egg holding kitchen utensil. As such, the general purpose of the present invention, which will be described subsequently in greater detail, is to provide a new and improved egg holding kitchen utensil and method which has all the advantages of the prior art and none of the disadvantages.

To attain this, the present invention essentially comprises a pair of cylindrical trays. Each tray has a base plate with a plurality of holes. The base plate has a top surface with an outer wall and a bottom surface with a plurality of feet that are opposed the outer wall. The outer wall of each tray has a plurality of holes. A spindle is integral the top surface of the base plate of each tray. The spindle is an equal distance from the outer wall. Each spindle has an upper portion with exterior threads and a lower portion with interior threads. The spindle of each tray has at least three long radial walls projecting therefrom and attaching to the outer wall for defining interior sections within each tray. Included are a plurality of arcuate members. Each has at least two short radial walls. One of each arcuate member is positioned within one of the interior sections of each tray and interconnecting with two of the long radial walls. Each of the short radial walls is attached to the outer wall of the tray when the arcuate member is connected with the two long radial walls of each tray. Also, a T-shaped handle is provided. The handle has a vertical member with an upper end that has a horizontal member attached. The vertical member has a bottom end with internal threads. The bottom end is capable of engaging the external threads of the upper portion of the spindle of any one of the pair of trays. Additionally, a lid is included. The lid has a large center hole and three large peripheral holes proportionately spaced from the large center hole. The lid has a plurality of small holes that are randomly spaced about the lid. The lid is sized for positioning over any one of the pair of trays. The large center hole of the lid is sized for receiving the bottom end of the handle when the lid is positioned on one of the pair of trays. Lastly, the upper portion of the spindle of one of the trays is capable of coupling with the lower portion of the spindle of another of the trays to allow stacking of the trays. The lid is positionable over one of the trays when the trays are stacked. The handle is coupled with one of the pair of trays for raising and lowering the pair of trays when the trays are stacked.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying Out the several purposes of the present invention. It is important, therefore, that the claims be regarded as including such equivalent constructions insofar as they do not depart from the spirit and scope of the present invention.

It is therefore an object of the present invention to provide a new and improved Egg holding kitchen utensil which has all of the advantages of the prior art egg holders and none of the disadvantages.

It is another object of the present invention to provide a new and improved egg holding kitchen utensil which may be easily and efficiently manufactured and marketed.

It is further object of the present invention to provide a new and improved egg holding kitchen utensil which is of durable and reliable constructions.

An even further object of the present invention is to provide a new and improved egg holding kitchen utensil which is susceptible of a low cost of manufacture with regard to both materials and labor, and which accordingly is then susceptible of low prices of sale to the consuming public, thereby making such egg holding kitchen utensil economically available to the buying public.

Even still another object of the present invention is to provide a egg holding kitchen utensil for providing a utensil for boiling and storing a large quantity of eggs within and further providing a stackable egg holding utensil.

Lastly, it is an object of the present invention to provide a new and improved egg holding kitchen utensil including a pair of cylindrical trays. Each tray has a base plate with a plurality of holes and an outer wall with a plurality of holes. A spindle is integral the base plate of each tray. Each spindle has an upper portion with exterior threads and a lower portion with interior threads. The spindle of each tray has at least three long radial walls projecting towards and attaching to the outer wall for defining interior sections within each tray. Included is a handle. The handle has a vertical member with an upper end that has a horizontal member attached. The vertical member has a bottom end with internal threads that are capable of engaging the external threads of the upper portion of the spindle of any one of the pair of trays. Lastly, a lid, with a large center hole, is sized for receiving the bottom end of the handle when the lid is positioned on one of the pair of trays.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
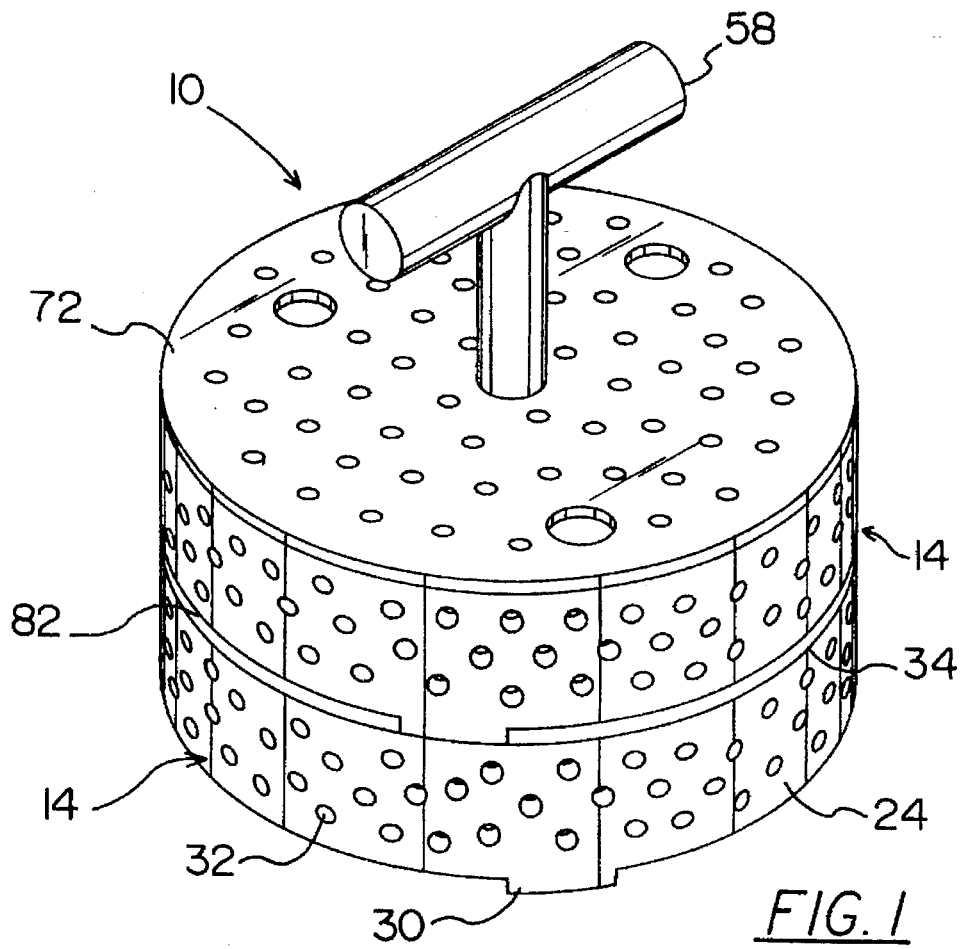
FIG. 1 is a perspective view of the preferred embodiment of the egg holding kitchen utensil constructed in accordance with the principles of the present invention.
Figure 2:
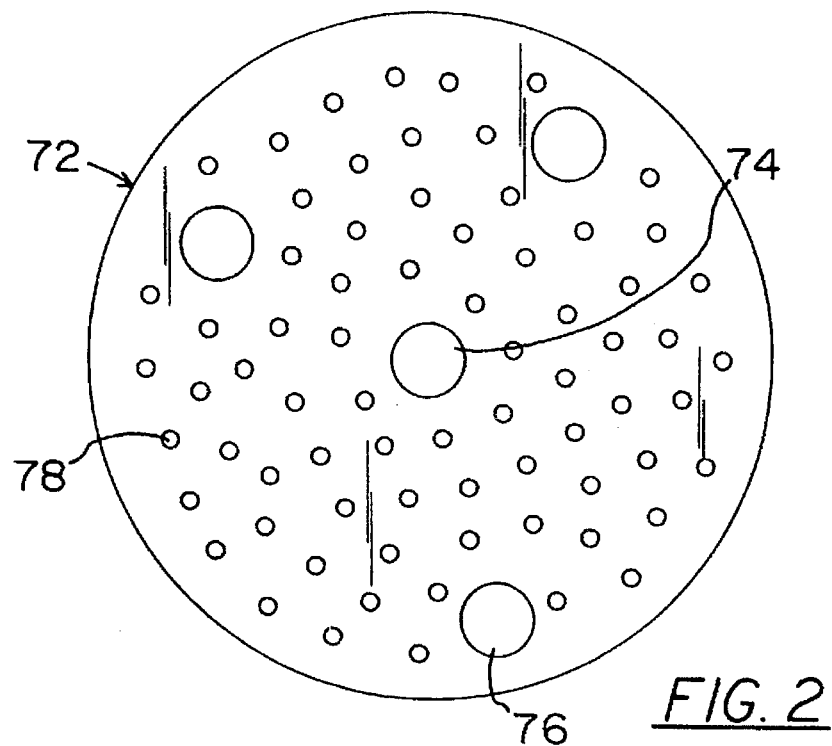
FIG. 2 is top plan view of the lid of the present invention.

With reference now to the drawings, and in particular to FIG. 1 thereof, the preferred embodiment of the new and improved egg holding kitchen utensil embodying the principles and concepts of the present invention and generally designated by the reference numeral 10 will be described.

The present invention, the egg holding kitchen utensil 10 is comprised of a plurality of components. Such components in their broadest context include a tray, a handle and a lid. Such components are individually configured and correlated with respect to each other so as to attain the desired objective.

Figure 3:
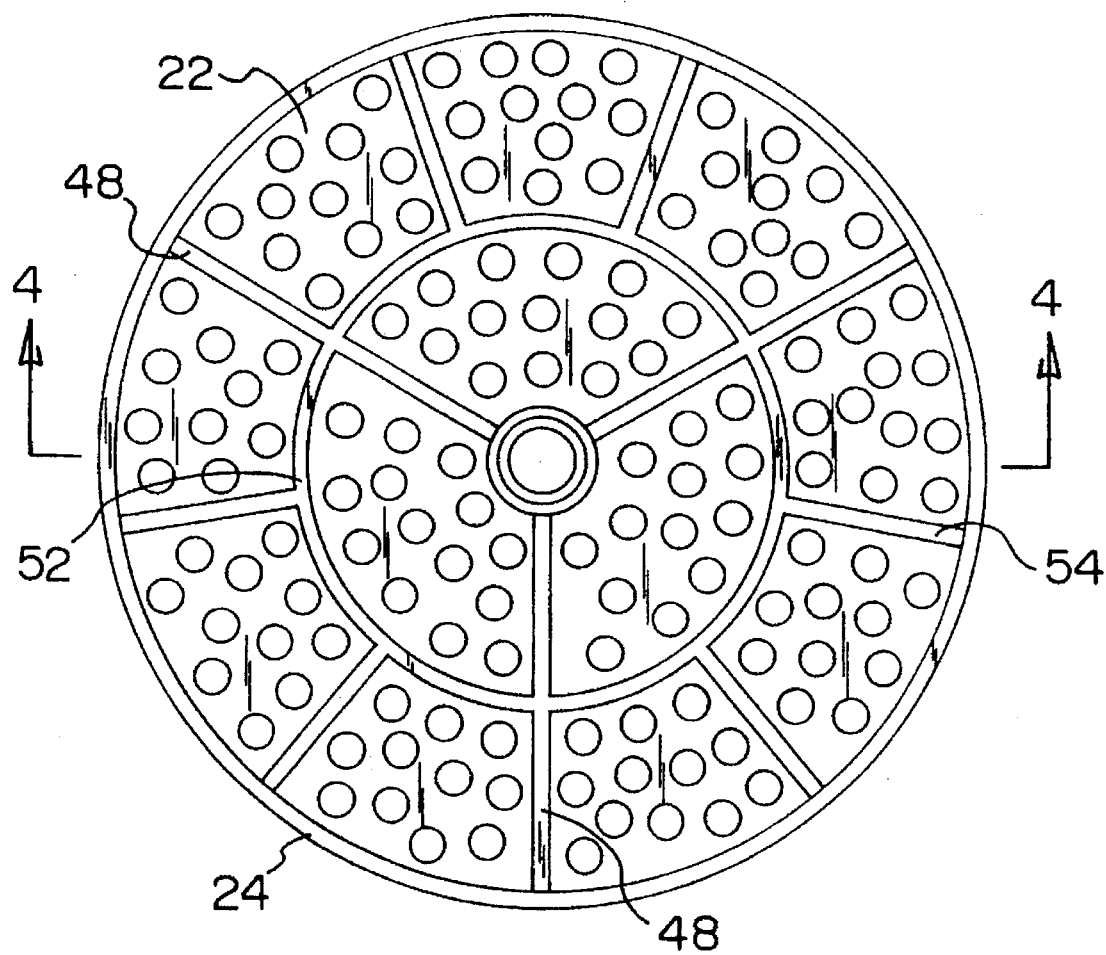
FIG. 3 is a top play view of one of the trays of the present invention.
Figure 5:
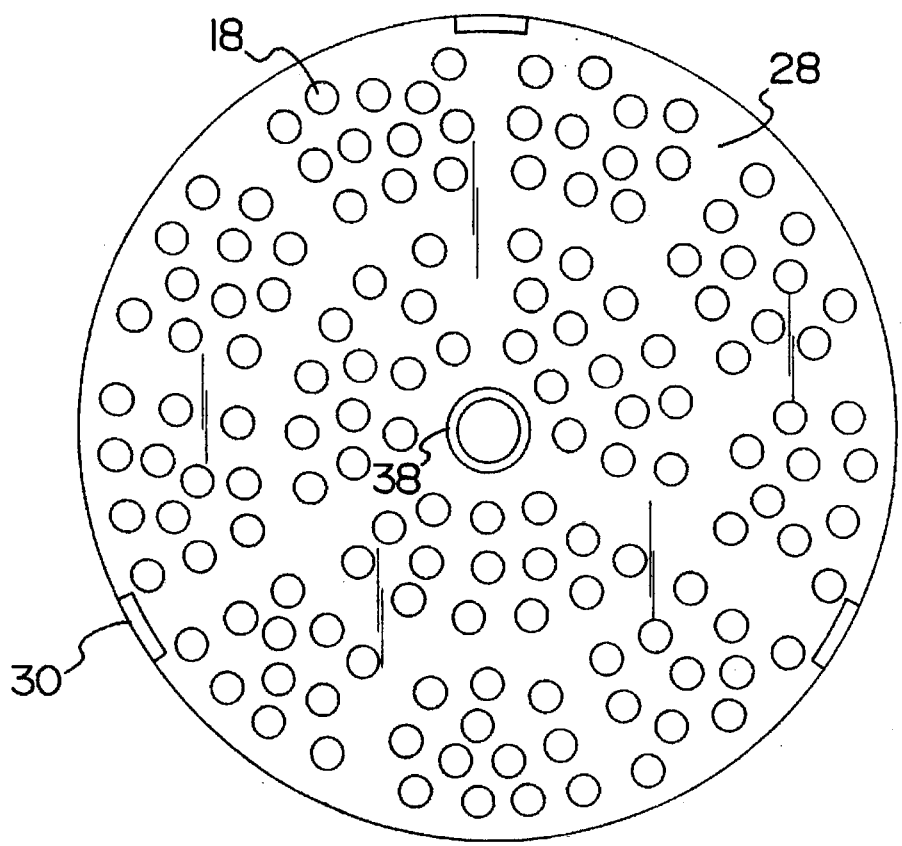
FIG. 5 is a bottom plan view of the base plate of the present invention.
Figure 6:
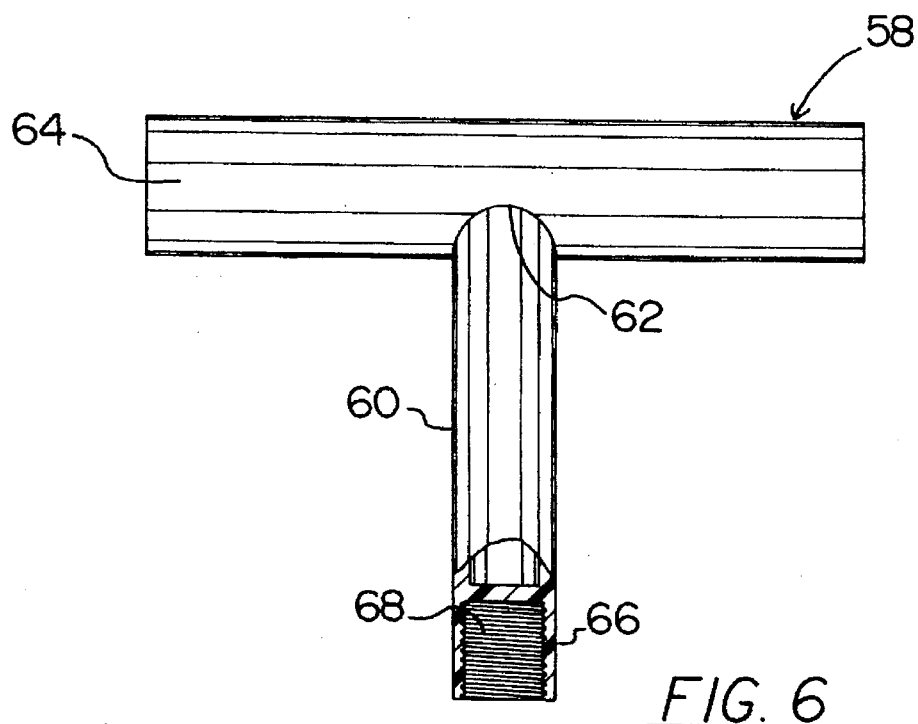
FIG. 6 is a side view of the handle of the present invention with a cut-away portion.

Specifically, the present invention includes a pair of cylindrical trays 14. Each tray has a base plate 16 with a plurality of holes 18. The base plate, as seen in FIG. 3, has a top surface 22. The top surface has an outer wall 24 that is interconnected. The base plate, as shown in FIG. 5, has a bottom surface 28 with a plurality of feet 30. The feet of the bottom surface are opposed the outer wall of the top surface. The outer wall of each tray, as shown in FIG. 1, has a plurality of holes 32 and a top edge 34.

Figure 4:
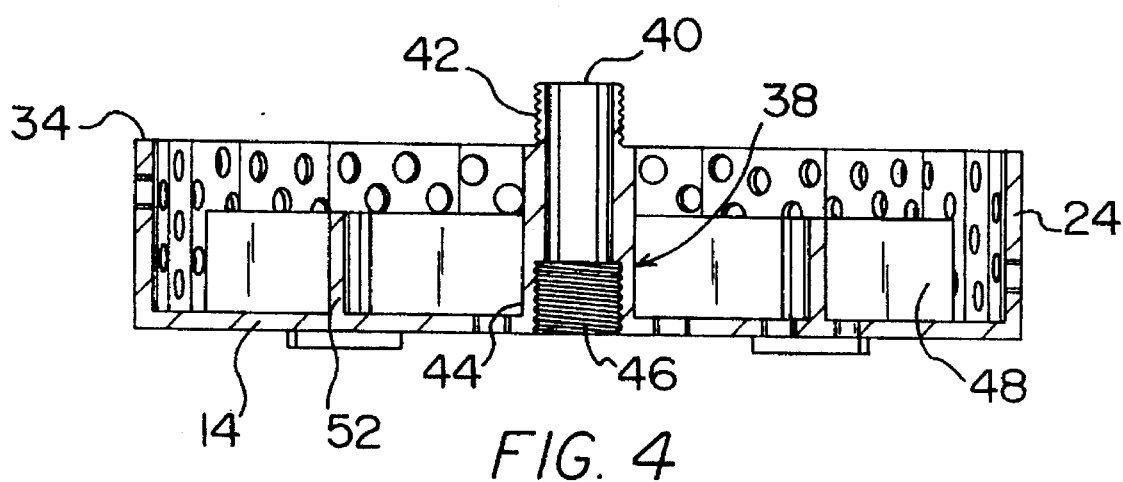
FIG. 4 is a cross-sectional view of the tray as taken along line 4—4 of FIG. 3.

As best illustrated in FIG. 4, each tray has a spindle 38 integral the top surface of the base plate 14. The spindle of each tray is an equal distance from the outer wall 24. Each spindle has an upper portion 40 with exterior threads 42 and a lower portion 44 with interior threads 46. The spindle of each tray has at least three long radial walls 48 projecting outwardly. Each of the three long radial walls attach to the outer wall for defining three interior sections within each tray. The three long radial walls extend upwardly from the top surface 22 and end half way from the top edge 34 of the outer wall 24.

Also, a plurality of arcuate members 52 are provided. Each arcuate member has at least two short radial walls 54. As depicted in FIG. 3, one of each arcuate member is positioned within one of the interior sections of each tray and interconnect with two of the long radial walls 48. Each of the short radial walls extend upward from the top surface and has a height equal to the height of the long radial walls. Each of the short radial walls is attached to the outer wall of the tray when the arcuate member is connected with the two long radial walls of each tray. Placement of the arcuate members within each tray further divides the interior sections. The newly formed interior sections are smaller in order to give each tray a total of twelve interior sections. Each interior sections of each tray is capable of holding an egg.

Included is a T-shaped handle 58. The handle has a vertical member 60 with an upper end 62 that has a horizontal member 64 attached. The vertical member has a bottom end 66 with internal threads 68. The bottom end is sized to engage the external threads of the upper portion of the spindle of any one of the pair of trays, as shown in FIG. 1.

Lastly, a lid 72 is provided. The lid has a large center hole 74 and three large peripheral holes 76 proportionately spaced from the large center hole. The lid has a plurality of small holes 78 that are randomly spaced about the lid. The lid is sized for positioning over any one of the pair of trays 14. The large center hole of the handle is sized to receive the bottom end 66 of the handle, when the lid is positioned on one of the pair of trays.

Furthermore, the upper portion of the spindle of one of the trays will couple with the lower portion of the spindle of another of the trays to allow the trays to be stacked. When the trays are stacked on top of the other, the feet of the one tray on top will cause a gap 82 to be formed. The gap prevents contact between the base plate of one tray with the other tray. The lid is positioned over one of the trays when the trays are stacked. The handle is placed through the large hole of the lid and coupled with one of the pair of trays. When the handle is coupled with one of the trays, it is able to raise and lowering the pair of trays when the trays are stacked. The handle is also able to couple with a single tray and raise and lower that tray.

The present invention egg holding kitchen utensil is formed of metal and plastic. Each cylindrical tray and components are formed of metal. The handle being formed of metal and a heat resistant plastic commonly used in commercially available pot handles. Each tray, with twelve interior sections, will hold one dozen eggs. When one tray is filled with eggs it may have another tray stacked on top. The other tray is locked in position by coupling the spindle of each tray. The other tray may be filled with a second dozen of eggs. When both trays have been filed the lid is placed on the tray on top. The handle is placed through the lid and coupled with the tray on top. The present invention works with one or two trays.

The present invention is lifted by the handle and placed into a pot of water. The trays of the present invention allow the eggs to be boiled within. The handle is used to remove the egg holding kitchen utensil from the pot of water. Water enters the present invention through the gap, and the holes of the base plate, the outer wall and the top. Water exits the interior of the present invention in the same manner. The feet of the tray on the bottom of the stack prevents the base plate from lying flat on the surface of the pot. The tray on the bottom of the stack, with the feet against the pot, has optimum water circulation. The eggs within the present invention are drained and cooled without removal. The height of the long radial walls and the short radial walls within each tray allows the water to circulate freely throughout the utensil as the eggs are boiled. Finally, after boiling and cooling the eggs, any unused eggs may be stored in the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved egg holding kitchen utensil for use when boiling eggs in a pot of water comprising in combination:

a pair of cylindrical trays with each tray having a base plate with a plurality of holes therethrough, the base plate having a top surface with an outer wall and a bottom surface with a plurality of feet being opposed the outer wall, the outer wall of each tray having a plurality of holes therethrough;

a spindle being integral the top surface of the base plate of each tray, the spindle being an equal distance from the outer wall, each spindle having an upper portion with exterior threads and a lower portion with interior threads, the spindle of each tray having at least three long radial walls projecting therefrom and attaching to the outer wall for defining interior sections within each tray;

a plurality of arcuate members with each having at least two short radial walls, one of each arcuate member being positioned within one of the interior sections of each tray and interconnecting with two of the long radial walls, each of the short radial walls being attached to the outer wall of the tray when the arcuate member being connected with the two long radial walls of each tray;

a T-shaped handle having a vertical member having an upper end with a horizontal member attached thereto, the vertical member having a bottom end with internal threads, the bottom end being capable of engaging the external threads of the upper portion of the spindle of any one of the pair of trays;

a lid having a large center hole and three large peripheral holes proportionately spaced from the large center hole, the lid having a plurality of small holes being randomly spaced about the lid, the lid being sized for positioning over any one of the pair of trays, the large center hole of the lid being sized for receiving the bottom end of the handle therethrough when the lid being positioned on one of the pair of trays; and the upper portion of the spindle of one of the trays being capable of coupling with the lower portion of the spindle of another of the trays for allowing the trays to be in a stacked positioned, the lid being positionable over one of the trays when the trays being stacked, the handle being coupled with one of the pair of trays for raising and lowering the pair of trays when the trays being stacked.

2. An egg holding kitchen utensil comprising:

a pair of cylindrical trays with each tray having a base plate with a plurality of holes therethrough and an outer wall with a plurality of holes therethrough;

a spindle being integral the base plate of each tray, each spindle having an upper portion with exterior threads and a lower portion with interior threads, the spindle of each tray having at least three long radial walls projecting therefrom and attaching to the outer wall for defining interior sections within each tray;

a handle having a vertical member with an upper end having a horizontal member attached thereto, the vertical member having a bottom end with internal threads capable of engaging the external threads of the upper portion of the spindle of any one of the pair of trays; and a lid having a large center hole being sized for receiving the bottom end of the handle therethrough when the lid being positioned on one of the pair of trays.

3. The egg holding kitchen utensil as set forth in claim 2, wherein the base plate having a top surface and a bottom surface with a plurality of feet being opposed the outer wall, and the plurality of feet providing a gap between the pair of trays when stacked one on top of the other.

4. The egg holding kitchen utensil as set forth in claim 3, wherein each spindle of each tray being integral the top surface of the base plate, and each spindle being an equal distance from the outer wall of each tray.

5. The egg holding kitchen utensil as set forth in claim 2, wherein each tray further including a plurality of arcuate members, each arcuate member having at least two short radial walls, one of each arcuate member being positioned within one of the interior sections of each tray and interconnecting with two of the long radial walls of the spindle, and each of the short radial walls being attached to the outer wall of the tray when the arcuate member being connected with the two long radial walls of each tray.

6. The egg holding kitchen utensil as set forth in claim 2, wherein the lid having three large peripheral holes proportionately spaced from the large center hole, and the lid having a plurality of small holes being randomly spaced about the lid.

7. The egg holding kitchen utensil as set forth in claim 2, wherein the upper portion of the spindle of one of the trays being capable of coupling with the lower portion of the spindle of another of the trays for allowing the trays to be in a stacked positioned, the lid being positionable over one of the trays when the trays being stacked, and the handle being coupled with one of the pair of trays for raising and lowering the pair of trays when the trays being stacked.

* * * * *